United States Patent
Park (10) Patent No.: US 11,337,779 B2
(45) Date of Patent: May 24, 2022

(54) MAGNETIC CLEAR ALIGNER SYSTEM

(71) Applicant: Janet Park, Houston, TX (US)

(72) Inventor: Janet Park, Houston, TX (US)

( * ) Notice: Subject to any disclaimer, the term of this patent is extended or adjusted under 35 U.S.C. 154(b) by 7 days.

(21) Appl. No.: 16/779,014

(22) Filed: Jan. 31, 2020

(65) Prior Publication Data

US 2020/0253694 A1 Aug. 13, 2020

Related U.S. Application Data

(60) Provisional application No. 62/799,940, filed on Feb. 1, 2019.

(51) Int. Cl.
*A61C 7/00* (2006.01)
*A61C 7/08* (2006.01)

(52) U.S. Cl.
CPC .............. *A61C 7/006* (2013.01); *A61C 7/08* (2013.01)

(58) Field of Classification Search
CPC .............. A61C 7/006; A61C 7/08; A61C 7/00
USPC ...................................... 433/18, 24
See application file for complete search history.

(56) References Cited

U.S. PATENT DOCUMENTS

| | | | | |
|---|---|---|---|---|
| 3,984,915 A * | 10/1976 | Noble | ............... | A61C 7/006 |
| | | | | 433/18 |
| 9,498,302 B1 * | 11/2016 | Patel | ............... | A61C 7/08 |
| 9,775,687 B1 * | 10/2017 | Hoyberg | ............... | A61C 7/006 |
| 2010/0183997 A1 * | 7/2010 | Darendeliler | .......... | A61C 7/006 |
| | | | | 433/6 |
| 2011/0020761 A1 * | 1/2011 | Kalili | ............... | A61C 7/08 |
| | | | | 433/6 |
| 2012/0285473 A1 * | 11/2012 | Wright | ............... | A63B 71/085 |
| | | | | 128/862 |
| 2013/0239978 A1 * | 9/2013 | Stubbs | ............... | A61C 5/90 |
| | | | | 128/861 |
| 2015/0173856 A1 * | 6/2015 | Lowe | ............... | A61C 7/00 |
| | | | | 433/24 |
| 2018/0071054 A1 * | 3/2018 | Ha | ............... | A61C 7/006 |
| 2018/0368961 A1 * | 12/2018 | Shanjani | ............ | A61K 49/0004 |

OTHER PUBLICATIONS

Bondemark et al., "Attractive Magnets for Orthodontic Extrusion of Crown-Root Fractured Teeth," American Journal of Orthodontics and Dentofacial Orthopedics, vol. 112, No. 2, pp. 187-193, Aug. 1997. (Year: 1997).*

* cited by examiner

*Primary Examiner* — Edward Moran
*Assistant Examiner* — Matthew P Saunders
(74) *Attorney, Agent, or Firm* — Oliff PLC (57) ABSTRACT

An aligner utilizes a magnetic interaction to reposition teeth. The aligner includes an inner layer sized and shaped to correspond to an exterior of a dental mold for an arrangement of teeth. The aligner includes an aligner magnet coupled to an exterior of the inner layer. The aligner includes an outer layer sized and shaped to correspond to an exterior of the inner layer and the aligner magnet. The inner layer is received within the outer layer and the aligner magnet is between the inner layer and the outer layer. The aligner magnet is positioned to magnetically interact with a magnetizable component attached to a select one of the teeth.

6 Claims, 4 Drawing Sheets

MAGNETIC CLEAR ALIGNER SYSTEM

PRIORITY/INCORPORATION BY REFERENCE

This application claims priority to U.S. Provisional Application 62/799,940 entitled "Magnetic Clear Aligner System," filed on Feb. 1, 2019, the entirety of which is incorporated herein by reference.

BACKGROUND INFORMATION

The exemplary embodiments relate generally to teeth aligners, and more particularly to a teeth aligner utilizing magnets to achieve tooth repositioning.

A aligner system is a series of aligners that are thermoplastic appliances designed to move one or more teeth of a patient from an initial position to a final position. Each aligner used in the aligner system for the patient may include a first aligner molded based on an initial position of the teeth and a first incremental moved position. The clear aligner may include one or more further aligners based on a previous incremental moved position and a subsequent or final incremental moved position. In this manner, the aligner system may incrementally move teeth from the initial position to the final position via a plurality of aligners that are used in sequence. Each aligner of the aligner system may be made from heating and forming a single thermoplastic material to a dental mold corresponding to a stage of treatment simulation as prescribed by the practitioner (e.g., orthodontist). Initial use of each aligner in the aligner system may not fit perfectly. After continued use of the aligner at a given stage for a prescribed amount of time (e.g., a week or two weeks), the teeth move and position themselves into the form of the aligner. Therefore, towards the end of using a specific aligner and with the intended result being achieved, the aligner may have an improved fit.

A conventional aligner system may be based on exertion of pressure based on a rigidity of the material used in manufacturing the aligner. Although the aligners may be used on their own, other conventional aligner systems may use composite attachments that are bonded to the teeth of the patient. The aligner used in such aligner systems include a housing or recess to receive the composite attachments. Accordingly, the aligner may exert pressure on the teeth as well as the composite attachments to produce the intended repositioning. However, the conventional approaches to the aligner system may not be applicable or feasible for certain types of tooth repositioning. A vertical tooth movement is hard to achieve with conventional aligner system. The composite attachment may help by providing a surface an aligner can exert force but the outcome is unpredictable. The tooth may or may not move even with the aligner force. Furthermore, certain practitioners have reported a tracking problem in which teeth are not moving as planned using the aligners in the conventional aligner systems which lead to poor fit of the aligners, particularly in subsequent stages of the process. Poor fit of aligners result in the proper exertion of pressure not being applied on the teeth as planned and may require additional time and resources from both the practitioner and patient, additional aligners to be incorporated in the process (e.g., to compensate for the lack of repositioning from the previous aligner in the sequence), etc.

SUMMARY

The exemplary embodiments are directed to an aligner. The aligner comprises an inner layer sized and shaped to correspond to an exterior of a dental mold for an arrangement of teeth. The aligner comprises an aligner magnet coupled to an exterior of the inner layer. The aligner comprises an outer layer sized and shaped to correspond to an exterior of the inner layer and the aligner magnet. The inner layer is received within the outer layer and the aligner magnet is between the inner layer and the outer layer. The aligner magnet is positioned to magnetically interact with a magnetizable component attached to a select one of the teeth.

The drawings are not necessarily to scale. The drawings are merely schematic representations, not intended to portray specific parameters of the exemplary embodiments. The drawings are intended to depict only typical exemplary embodiments.

DETAILED DESCRIPTION

The exemplary embodiments may be further understood with reference to the following description and the related appended drawings, wherein like elements are provided with the same reference numerals. The exemplary embodiments are related to a device, system, and method for a magnetic aligner system configured to reposition one or more teeth from an initial position to a final position. The magnetic aligner system according to the exemplary embodiments may include one or more aligners where each aligner includes an inner layer and an outer layer. In the exemplary embodiments, a magnet may be disposed between the inner layer and the outer layer that interacts with a magnetizable component attached to a tooth (e.g., stainless steel, steel, other metals, etc.). As will be described herein, the magnet and the magnetizable component attached to a tooth may cause the tooth to reposition to a desired, final position.

The exemplary embodiments are described with relative directions and positioning. For illustrative purposes, the term "top" may be based on the perspective of the patient referring to a direction toward the top of the head while the term "bottom" may refer to a direction toward the chin. The term "inner" may be based on the perspective of the teeth of the patient referring to a position closer to the tooth while "outer" may refer to a direction further from the tooth. However, those skilled in the art will understand that any directional descriptor may be used and contemplated within the scope of the exemplary embodiments.

Conventional approaches to aligner systems do not utilize magnets for a variety of reasons. In the dental field, a conventional approach has been made in using a magnet with a thermoplastic splint, but only in a case study. In this conventional approach, a first magnet was positioned in a composite resin on the surface of a thermoformed splint. A second magnet was bonded to a fractured tooth to extrude the tooth (e.g., in a vertical direction). However, this approach is not designed or applicable to a repositioning of the tooth, particularly in a horizontal manner. Another conventional approach in another case study used magnets to extrude a fractured tooth by bonding a magnet to the fractured tooth with a composite and embedding another magnet in an acrylic of a removable appliance. This conventional approach may be configured to move the tooth in a vertical direction but does not allow for a precise and predictable movement of the tooth in various other directions, particularly in a horizontal direction. Furthermore, these conventional approaches utilize a method of production that is not a preferred process because if the bond between the composite/acrylic and the magnet or between the composite/acrylic and the surface of the appliance were poor, the magnets may detach from the appliances.

The exemplary embodiments provide an aligner system that produces more predictable tooth movement in repositioning the tooth through placement of magnets in aligners that interact with magnetizable component attached to a tooth from a magnetic attractive or repulsive force that allows a tooth to move even without the aligner material directly contacting the tooth or a composite attachment that aids in moving teeth. In using the aligner system according to the exemplary embodiments, a precise and safe method efficiently repositions the teeth of a patient. The exemplary embodiments also allow for customization with safe, predictable, and systematic procedures, particularly in view of a magnet being located between polymeric layers. Accordingly, the exemplary embodiments address the difficulty in fabricating a series of aligners to be used in an aligner system at a given time (e.g., when a prescribed sequence is determined) without the need to require knowledge of a current position of teeth at every stage of the sequence.

Figure 1:
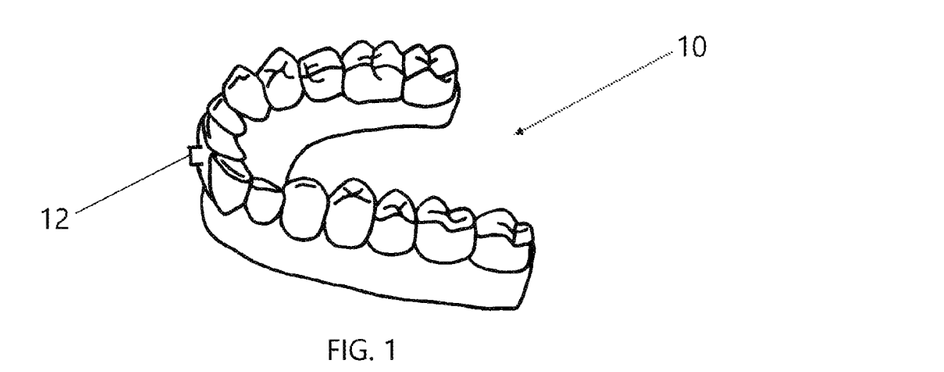
FIG. 1 shows an exemplary dental model from which an aligner in an aligner system is designed according to various exemplary embodiments described herein.

FIG. 1 shows an exemplary dental model 10 from which an aligner in an aligner system is designed according to various exemplary embodiments described herein. The dental model 10 may be fabricated based on a variety of different techniques that determine an arrangement of teeth of a patient. For example, a practitioner may use an impression that creates a mold corresponding to the arrangement of teeth of the patient. A material may fill the mold and, upon removal from the mold, create the dental mold 10. In another example, the practitioner may scan the teeth (e.g., a visual scan) that generates a virtual model of the arrangement of the teeth of the patient. A printing component may generate the dental mold 10 based on the scan (e.g., a three-dimensional printer). The dental mold 10 may be fabricated using a variety of different materials that enable the aligner in the aligner system to be fabricated.

A patient may have one or more teeth that require repositioning. According to the exemplary embodiments, a magnetizable component attached to a select one of the teeth (hereinafter referred to as a "magnetizable component") may be attached to the one or more teeth that require repositioning. For illustrative purposes, the exemplary embodiments are described with regard to a plurality of teeth being repositioned. However, those skilled in the art will understand that there may be instances when only a single tooth requires repositioning. The aligner system may also be utilized in such instances within the scope of the exemplary embodiments.

The practitioner who is prescribing the aligner system according to the exemplary embodiments may determine which teeth are to have a respective magnetizable component attached thereto. The magnetizable component may be any magnet, metal, or magnetizable material that enables a magnetic force to be created. However, those skilled in the art will understand that the exemplary embodiments may be modified to use any material that interacts with another material to generate an attractive or repulsive force that results in an underlying tooth to be repositioned. The practitioner may determine whether a selected tooth is to have one or more magnetizable component attached thereto to achieve a desired repositioning of the tooth. The magnetizable component may have a volume that extends from a surface of the tooth on which the magnetizable component is attached. The magnetizable component may also exhibit any shape. For example, the magnetizable component may be cylindrical with a circular end surface being attached to the tooth. In another example, magnetizable component may have a polygonal cross-sectional shape where a cross-section along a plane is a trapezoid. Those skilled in the art will understand the various shapes that the magnetizable component may have and be used within the scope of the exemplary embodiments.

The magnetizable component may be attached to the tooth using a variety of attachment processes that allow for eventual detachment of the magnetizable component. For example, the magnetizable component may be attached to the tooth by applying a dental bond. In another example, the magnetizable component may be attached using a physical attachment component. The magnetizable component may be attached through any of these processes in a way that the magnetizable component remains fixed to the tooth in a desired position until the magnetizable component is to be detached from the tooth (e.g., upon completion of the tooth repositioning when the tooth has moved to a final position).

Due to the magnetizable component occupying a non-zero volume and the aligners in the aligner system being fabricated to provide a substantially close or snug fit within range for the aligner system of the exemplary embodiments to provide the intended result, the dental mold 10 may be fabricated in view of the magnetizable component being present. As illustrated, the dental mold 10 may include an attachment form 12 that extends from a surface of a tooth that is to be repositioned. For illustrative purposes, FIG. 1 only shows a single attachment form 12. However, depending on each tooth that is to be repositioned, the dental mold 10 may include any number of attachment forms 12 that correspond to a number of magnetizable component that will be attached to the teeth of the patient.

The attachment form 12 may have a shape corresponding to the shape of the magnetizable component that is to be attached to the tooth. The attachment form 12 may have a size that also corresponds to the shape of the magnetizable component that is to be attached to the tooth. However, to provide room for snapping the aligner into place on the patient and/or to provide a safety margin, the attachment form 12 may be included on the dental mold 10 with an increased size. In this manner, the resulting aligner may be fabricated based on an enlarged attachment form 12 to facilitate tooth movement within the aligners.

Based on the manner in which the dental mold 10 is fabricated, the attachment form 12 may be incorporated in a variety of ways. For example, when using an impression, the practitioner may include a recess in the mold that corresponds to the magnetizable component on each tooth that is to include one or more magnetizable component. Thus, when the material fills the mold, the resulting dental mold 10 may include the attachment form 12. In another example, when using the impression, the practitioner may fill the mold with the material and the resulting dental mold 10 may be modified by adding the attachment form 12. In a further example, when using the scan, the virtual image of the arrangement of teeth may be modified by including the attachment form 12 onto each tooth that is to have at least one magnetizable component. Thus, the modified virtual image may be used to fabricate or print the dental mold 10 with the attachment form 12 included. In a substantially similar manner as the impression, the dental mold 10 may be fabricated based on the scan alone and the attachment form 12 may be added at a subsequent time.

As illustrated in FIG. 1, the magnetizable component may be intended to be attached on an outer surface of the tooth. However, those skilled in the art will understand that the magnetizable component may also be attached on an inner surface of the tooth. Depending on the type of magnetic interaction is to be used, the practitioner may determine the placement of the magnetizable component on the tooth to ensure that the repositioning of the tooth is achieved in an intended timeframe. For example, the magnetic interaction may be an attraction. If the tooth is to be repositioned by moving outward using an attractive magnetic interaction, the magnetizable component may be placed on the outer surface of the tooth. If the tooth is to be repositioned by moving inward using an attractive magnetic interaction, the magnetizable component may be placed on the inner surface of the tooth. In another example, the magnetic interaction may be a repulsion. If the tooth is to be repositioned by moving outward using a repulsive magnetic interaction, the magnetizable component may be placed on the inner surface of the tooth. If the tooth is to be repositioned by moving inward using a repulsive magnetic interaction, the magnetizable component may be placed on the outer surface of the tooth. The exemplary embodiments may be utilized in any of these scenarios involving magnetic interactions and desired repositioning.

Based on a planned sequence of aligners in the aligner system to be used for the patient, a respective dental mold 10 may be fabricated for each step of the sequence. For example, for a given patient, based on the initial position of the teeth and a desired final position of the teeth, the practitioner may determine a number of steps that are to be used in sequence to reach the desired final position (e.g., based on a degree of repositioning and an expected respective movement during each step). The practitioner may determine the planned sequence when an initial arrangement of the teeth is received (e.g., via impression, scan, etc.). Thus, the practitioner may indicate how each dental mold 10 is to be fabricated for each step of the sequence at a substantial onset of the dental procedure. However, those skilled in the art will appreciate that the exemplary embodiments may also utilize dental molds 10 that may be fabricated during the dental procedure of repositioning the teeth to the desired final positions at any time prior to the conclusion of the dental procedure (e.g., patient error or reduced time of use may cause the teeth to not move to the intended temporary position in the intended timeframe).

Figure 2:
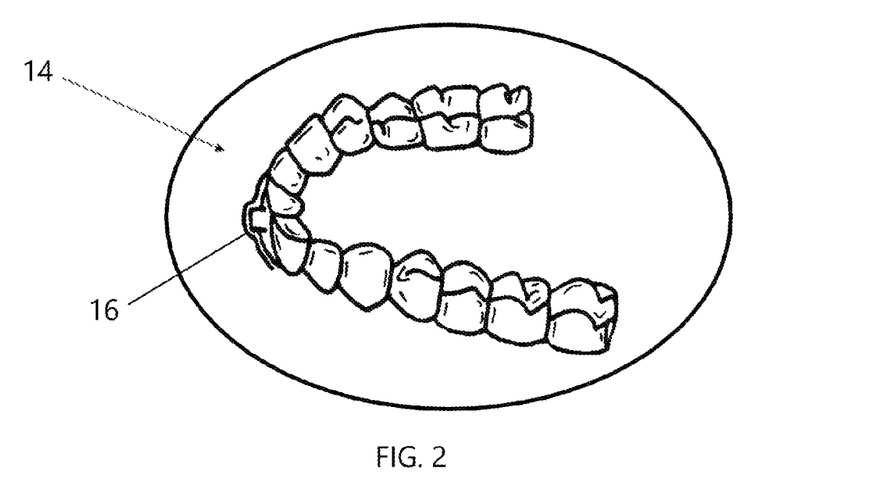
FIG. 2 shows an exemplary inner layer of the aligner in the aligner system according to various exemplary embodiments described herein.
Figure 3:
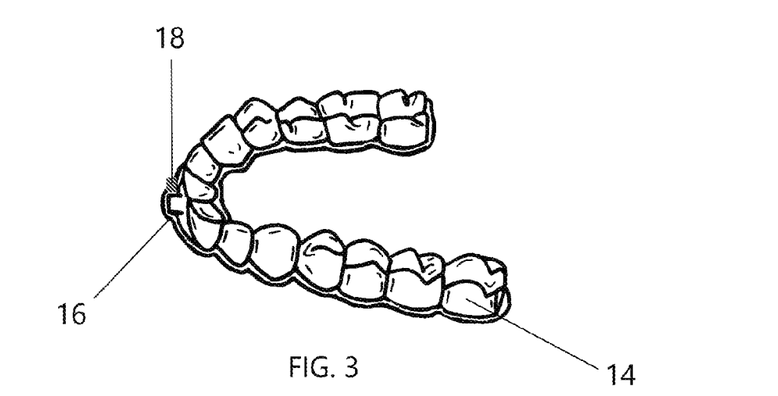
FIG. 3 shows the exemplary inner layer of the aligner of FIG. 2 in a trimmed state according to various exemplary embodiments described herein.
Figure 4:
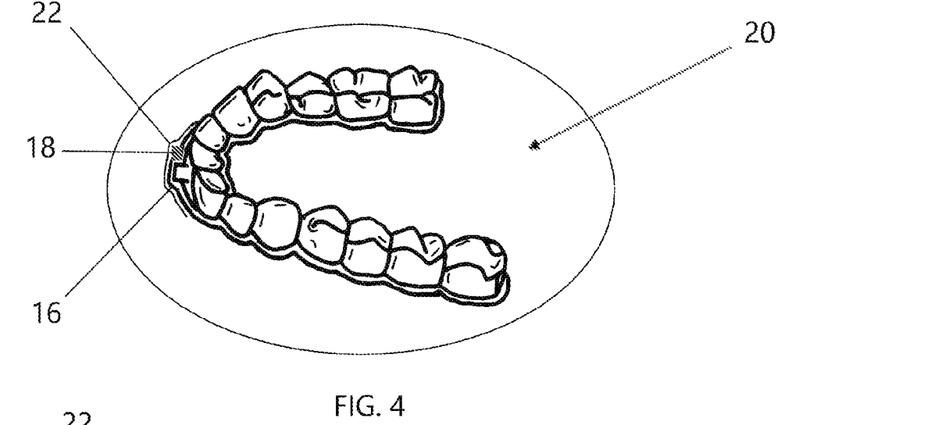
FIG. 4 shows an exemplary outer layer utilized with the exemplary inner layer of the aligner in the aligner system of FIG. 3 according to various exemplary embodiments described herein.
Figure 5:
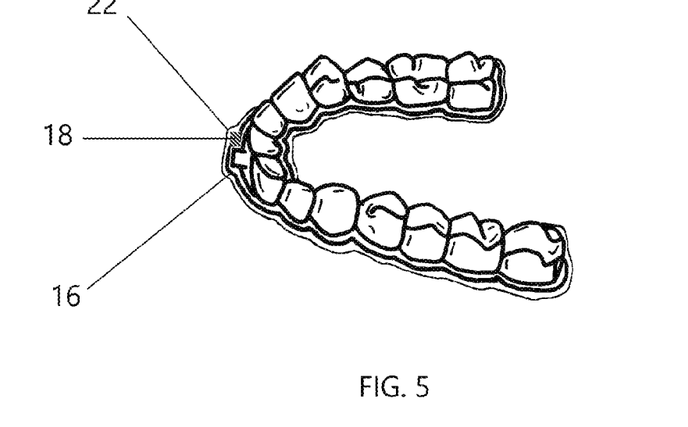
FIG. 5 shows the exemplary outer layer of the aligner of FIG. 4 in a trimmed state according to various exemplary embodiments described herein.

Using the dental mold 10 including one or more of the attachment form 12, the aligner in the aligner system according to the exemplary embodiments may be fabricated. FIGS. 2-5 show the aligner in the aligner system according to various exemplary embodiments. For example, FIG. 2 shows an exemplary inner layer 14 of the aligner in the aligner system according to various exemplary embodiments described herein and FIG. 3 shows the exemplary inner layer 14 of the aligner of FIG. 2 in a trimmed state according to various exemplary embodiments described herein. FIG. 4 shows an exemplary outer layer 20 utilized with the exemplary inner layer 14 of the aligner in the aligner system of FIG. 3 according to various exemplary embodiments described herein and FIG. 5 shows the exemplary outer layer 20 of the aligner of FIG. 4 in a trimmed state according to various exemplary embodiments described herein.

The inner layer 14 may be fabricated using a variety of materials. For example, the inner layer 14 may be made of a polymer having one or more polymeric layers. The inner layer 14 may have a minimal thickness that allows the repositioning of the teeth to be achieved through a magnetic interaction while minimizing inadvertent movement of the magnets that are involved.

In the fabrication process of fabricating the inner layer 14, according to an exemplary embodiment, a thermoplastic sheet may be heated and formed to the dental mold 10 including the attachment form 12. For each attachment form 12 on the dental mold 10 corresponding to a magnetizable component intended to be attached to the teeth of the patient, the inner layer 14 may include an attachment housing 16. The attachment housing 16 may be a recess that houses the magnetizable component when the aligner has been positioned in the patient's mouth to encase the teeth. With each of the attachment form 12 being shaped and properly sized for a respective magnetizable component at respective attachment positions, the inner layer 14 including the attachment housing 16 may be fabricated with a corresponding exterior shape of the teeth of the patient such that the inner layer 14 has a contour that corresponds to the teeth including any magnetizable component.

When the inner layer 14 has been fabricated, the inner layer 14 may include extraneous material that may be trimmed or removed, particularly to provide a comfortable feel for the patient. For example, the inner layer 14 may be trimmed to correspond to the exposed portions of the teeth while avoiding any or undue contact with the gums of the patient.

The inner layer 14 may also include a magnet (hereinafter referred to as "aligner magnet 18") that interacts with the magnetizable component attached to the tooth of the patient. The aligner magnet 18 may be placed on an exterior of the inner layer 14 on or around the attachment housing 18 in a position that allows the magnet to interact with the magnetizable component to produce a sufficient magnetic force that repositions the tooth as intended. For example, the aligner magnet 18 may be placed near the attachment housing 18 within a predetermined distance for a desired magnetic interaction with the magnetizable component to be achieved. As will be described in exemplary embodiments below, the aligner magnet 18 may be placed adjacent the attachment housing 18 or over the attachment housing 18.

According to an exemplary embodiment, the aligner magnet 18 may be permanently or temporarily fixed to the inner layer 14.

The outer layer 20 may be fabricated using a variety of materials in a manner substantially similar to the inner layer 14. The outer layer 20 may have a minimal thickness that allows the repositioning of the teeth to be achieved through a magnetic interaction while minimizing inadvertent movement of the magnets that are involved.

In the fabrication process of fabricating the outer layer 20, according to an exemplary embodiment, a thermoplastic sheet may be heated and formed to the inner layer 14 including any attachment housing 16 and any aligner magnet 18. For each attachment housing 16 on the inner layer 14 and aligner magnet 18 on or adjacent the attachment housing 16, the outer layer 20 may include an outer layer housing 22. The outer layer housing 22 may be a recess that houses the attachment housing 16 and the aligner magnet 18. For each of the attachment housing 16 and the aligner magnet 18, the outer layer 20 including the outer layer housing 22 may be fabricated with a corresponding exterior shape of the inner layer 14 such that the outer layer 20 has a contour that corresponds to the inner layer 14 with any aligner magnet 18.

When the outer layer 20 has been fabricated, the outer layer 20 may include extraneous material that may be trimmed or removed, particularly to provide a comfortable feel for the patient. Thus, the outer layer 20 may be trimmed in a substantially similar manner as the inner layer 14 to correspond to the exposed portions of the teeth while avoiding any or undue contact with the gums of the patient.

The aligner in the aligner system may be assembled by combining the inner layer 14 and the outer layer 20. For example, the outer layer 20 may be snapped over the inner layer 14. Thus, an interior surface of the outer layer 20 may be adjacent an outer surface of the inner layer 14. In fabricating the outer layer 20 to include the outer layer housing 22, the attachment form 16 and the aligner magnet 18 may be nestled in the outer layer housing 22 when the aligner is assembled. In assembling the aligner, the inner layer 14 and/or the outer layer 20 may be heat and/or pressure treated such that the aligner remains assembled and the inner layer 14 and the outer layer 20 do not detach from one another. The heat and/or pressure treatment may also be used to assemble the aligner to appear as though there is only a single layer from the perspective of the patient.

In using the aligner in the aligner system according to the exemplary embodiments, the patient may have had the magnetizable component attached to select teeth based on the practitioner's planned sequence of repositioning the teeth. The practitioner may use any means of attaching the magnetizable component onto the teeth. For example, the practitioner may manually attach the magnetizable component. Particularly when the dental mold 10 is fabricated with an enlarged attachment form 12, the inner layer 14 may allow for a margin of error in attaching the magnetizable component while still allowing for an intended repositioning that also considers movement of the magnetizable component while the tooth is being repositioned. In another example, the practitioner may utilize a guidance system pre-programmed with the planned sequence. Thus, for a given aligner corresponding to a step in the sequence, the guidance system may provide an indication to the practitioner as to where the magnetizable component is to be attached.

When the magnetizable component have been attached to the teeth of the patient, the aligner may be snapped into position to encase the teeth of the patient. The magnetizable component and the aligner magnet 18 may interact with one another to reposition the teeth according to the prescribed plan of the practitioner. When the aligner has repositioned the teeth to the intended positions for the aligner, upon confirmation by the practitioner, the patient may be provided the next set of aligners to be used in the planned sequence. This process may repeat until the teeth of the patient have been repositioned to the desired final positions.

Figure 6:
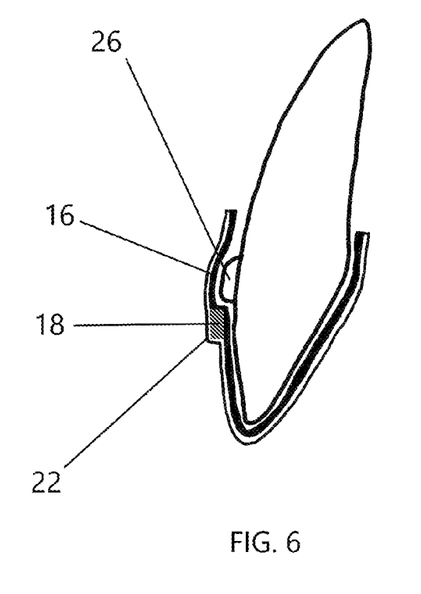
FIG. 6 shows a first cross sectional view of a first magnetic configuration for the aligner in the aligner system according to various exemplary embodiments described herein.

As described above, the aligner magnet 18 may be positioned in a variety of different locations relative to the magnetizable component. FIG. 6 shows a first cross sectional view of a first magnetic configuration for the aligner in the aligner system according to various exemplary embodiments described herein. A magnetizable component 26 may be attached to the tooth on an outer surface. The aligner may be assembled with the inner layer 14 nestled within the outer layer 20. In the assembled state and as illustrated in FIG. 6, the inner layer 14 may include the attachment housing 16 that houses the magnetizable component 26. In the first magnetic configuration, the aligner magnet 18 may be positioned adjacent to the magnetizable component 26. For example, the magnetizable component 26 may be positioned on a top disposition while the aligner magnet 18 is positioned on a bottom disposition. However, the adjacent disposition of the magnetizable component 26 and the aligner magnet 18 may be differently oriented. For example, the magnetizable component 26 and the aligner magnet 18 may be positioned in a side-by-side orientation.

Figure 7:
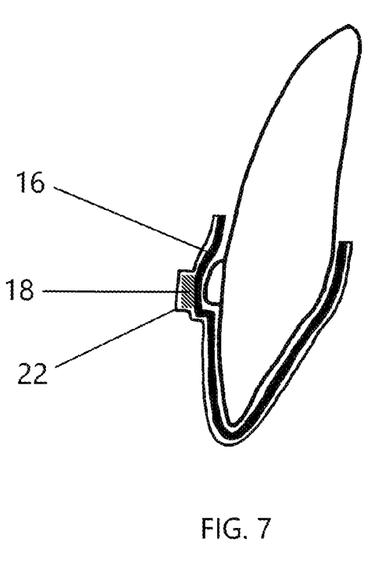
FIG. 7 shows a second cross sectional view of a second magnetic configuration for the aligner in the aligner system according to the various exemplary embodiments described herein.

FIG. 7 shows a second cross sectional view of a second magnetic configuration for the aligner in the aligner system according to the various exemplary embodiments described herein. The magnetizable component 26 may be attached to the tooth on an outer surface. The aligner may be assembled with the inner layer 14 nestled within the outer layer 20. In the assembled state and as illustrated in FIG. 7, the inner layer 14 may include the attachment housing 16 that houses the magnetizable component 26. In the second magnetic configuration, the aligner magnet 18 may be positioned over the magnetizable component 26.

The magnetic orientation of the magnetizable component 26 and the aligner magnet 18 may be selected according to the various magnetic interactions that may be used in repositioning the teeth to a desired final position. As one skilled in the art will understand, the various orientations for the magnetic configurations may allow for movement in each direction in a lateral, longitudinal, or rotational manner. For example, if the magnetic interaction is to move the tooth in a vertical direction, the vertical orientation may be used where the magnetizable component 26 and the aligner magnet 18 are oriented on top of one another. In another example, if the magnetic interaction is to move the tooth in a horizontal direction (e.g., along an axis perpendicular to an axis extending from an interior to an exterior of the tooth), the horizontal orientation may be used where the magnetizable component 26 and the aligner magnet 18 are oriented next to one another in a side-by-side arrangement. In a further example, if the magnetic orientation is to move the tooth in a horizontal direction (e.g., along an axis extending from an interior to an exterior of the tooth), the stacking orientation may be used where the magnetizable component 26 and the aligner magnet 18 are oriented over one another. In yet another example, if the magnetic orientation is to move the tooth in a rotational direction, the magnetizable component 26 may be positioned toward a side edge of the tooth and the aligner magnet may be positioned adjacent the magnetizable component in a side-by-side position. In this manner, depending on the type of movement to be achieved, the practitioner may select the type of magnetic configuration to be used for each tooth and position the magnetizable component 26 and the aligner magnet 18 in a corresponding manner.

The magnetizable component 26 and/or the aligner magnet 18 that are included in the aligner may be of any type. For example, the magnetizable component 26 and the aligner magnet 18 may be neodymium for its stronger magnetic properties. The magnetizable component 26 and/or the aligner magnet 18 may also be coated to prevent corrosion. Similar coatings may be applied to the inner layer 14 and/or the outer layer 20.

The aligners in the aligner system according to the exemplary embodiments may be fabricated with various cosmetic features. For example, the thermoplastics used in the polymeric layers of the inner layer 14 and/or the outer layer 20 may have a transparent quality. In this manner, the aligners may be substantially clear. The magnets may also have cosmetic features such that use of the aligners may have an invisible appearance (e.g., color the magnetizable component and the aligner magnet to match a color of the underlying tooth). In another example, the aligner may be opaque and/or colored to hide the magnets that are being used in the aligner. The coloring of the aligners may be selected by the patient, the practitioner, the manufacturer, etc. such as a natural tooth color.

The inner layer 14 in the aligner system may only cover a portion of dental model 10, around the magnetizable component 26. Furthermore, the inner layer 14 may be sectioned so that each section may cover specific area (e.g. magnetizable components) of dental model 10.

Figure 8:
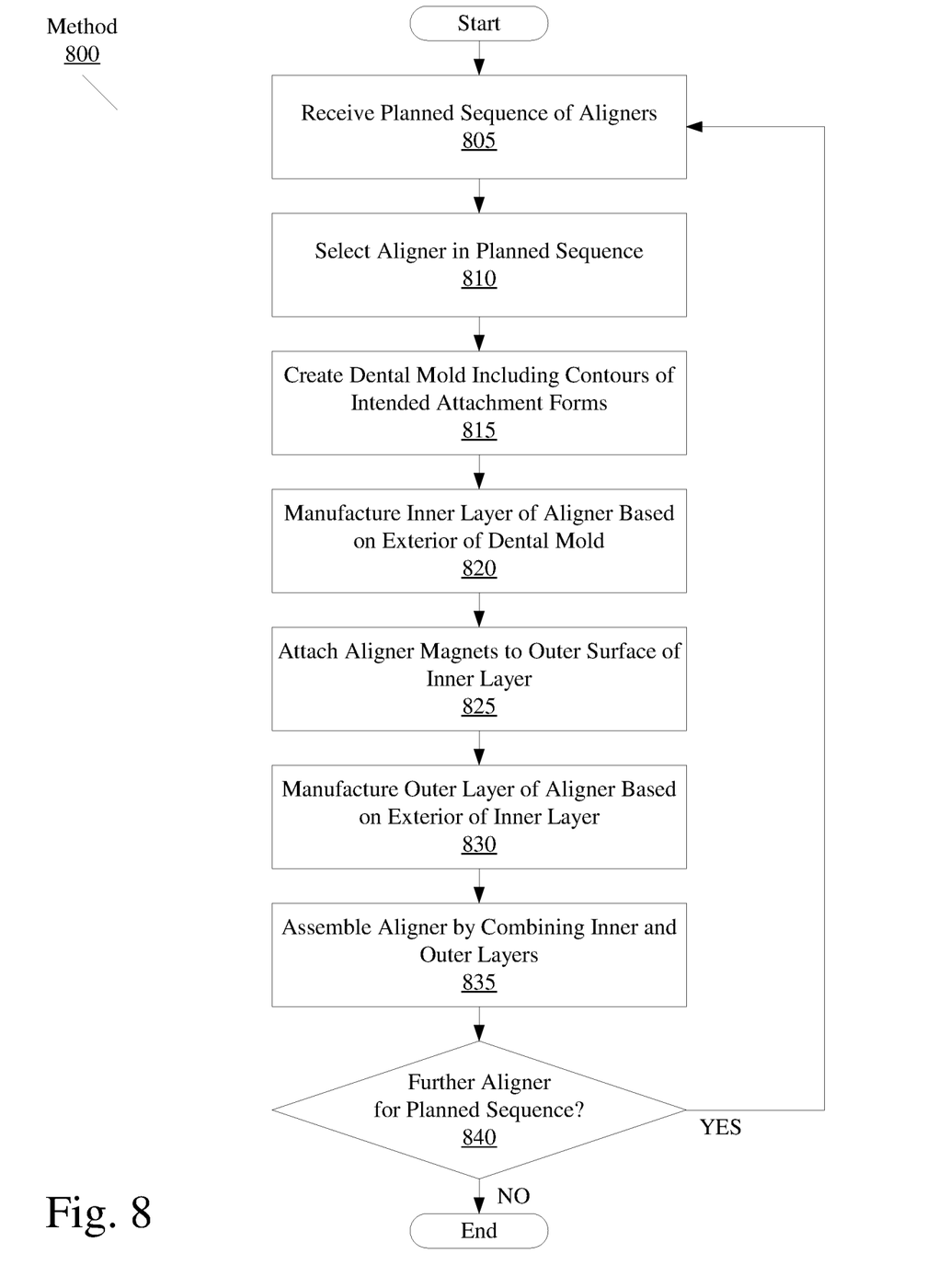
FIG. 8 shows a method to manufacture the aligner in the aligner system according to the various exemplary embodiments described herein.

FIG. 8 shows a method 800 to manufacture the aligner in the aligner system according to the various exemplary embodiments described herein. The method 800 describes how each aligner to be used in a planned sequence are fabricated and prepared to be provided to the patient for use during each stage of the planned sequence. The method 800 may be performed by a variety of individuals and/or entities involved with the fabrication of the aligners and may utilize a variety of different devices. The method 800 will be described from the perspective of different individuals and/or entities that perform the steps. However, it should be noted that a single individual and/or entity may perform the method 800 using any means to fabricate the aligners.

Prior to the method 800, a practitioner may have examined the teeth of the patient. The practitioner may formulate a planned sequence to use so that the teeth of the patient are repositioned from an initial position to a desired final position.

In 805, an aligner manufacturing entity may receive the planned sequence of aligners to be used for the patient. The aligner manufacturing entity may separate the planned sequence into individual steps which have respective aligners to be used. In 810, the aligner manufacturing entity selects an aligner to be used in the sequence. For example, the aligner manufacturing entity may select the first step and the first aligner that is to be used.

In 815, the aligner manufacturing entity creates a dental mold 10 based on an impression and/or a scan of the teeth of the patient based on the positioning of the teeth corresponding to the selected aligner. The dental mold 10 may include the contours of the teeth in the corresponding position and may also include any attachment form 12 that corresponds to a magnetizable component 26 that is to be attached to the teeth. The planned sequence from the practitioner may have indicated where the magnetizable components 26 are to be positioned. As described above, there may be a variety of different ways for the dental mold 10 to be fabricated.

In 820, the aligner manufacturing entity manufactures an inner layer 14 for the selected aligner. The inner layer 14 may be formed using a thermoplastic layer that is heated and formed into a shape that corresponds to an exterior of the dental mold 10 which may include one or more attachment forms 12. For each attachment form 12, the inner layer 14 may include an attachment housing 16.

In 825, the aligner manufacturing entity attaches an aligner magnet 18 for each attachment housing 16 on the inner layer 14. The aligner manufacturing entity may place the aligner magnet 18 relative to the attachment housing 16. For example, based on the planned sequence and any indication provided by the practitioner, the aligner manufacturing entity may position the aligner magnet 18 on the inner layer 14 for an intended repositioning of the tooth to be achieved. The aligner magnet 18 may be attached to an exterior of the inner layer 14 in a variety of manners including permanent, semi-permanent, placement, etc.

In 830, the aligner manufacturing entity manufactures an outer layer 20 for the selected aligner. The outer layer 20 may be formed using a thermoplastic layer that is heated and formed into a shape that corresponds to an exterior of the inner layer 14 which may include one or more attachment housing 16 and one or more aligner magnets 18. For each combination of attachment housing 15 and aligner magnet 18, the outer layer 20 may include an outer layer housing 22.

In 835, the aligner manufacturing entity assembles the aligner by combining the inner layer 14 and the outer layer 20. For example, the inner layer 14 may be nestled within the outer layer 20 such that an exterior surface of the inner layer 14 is adjacent an interior surface of the outer layer 20. In assembling the aligner, the aligner manufacturing entity may treat the combination with heat and/or pressure so that the aligner remains assembled and have an appearance and/or feel of being a single layer.

In 840, the aligner manufacturing entity determines whether there are any further aligners that need fabrication for the planned sequence. If there is at least one further aligner to be fabricated, the aligner manufacturing entity returns to 810 to select another aligner in the planned sequence. If all aligners involved in the planned sequence have been fabricated, the aligner manufacturing entity may provide the aligners to the practitioner and/or the patient.

The exemplary embodiments are directed toward a device, system, and method of an aligner system including one or more aligners used by a patient to reposition teeth from an initial position to a final position. The aligners may utilize a magnetic interaction between a magnetizable component attached to a tooth and a magnet included in the aligner between an inner layer and an outer layer of the aligner. The magnetic interaction may generate a magnetic force that moves the tooth toward the final position.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising following sequential steps of:
   a first step of providing an attachment form to a dental mold for an arrangement of teeth, the attachment form having an enlarged size greater than a size of a magnetizable component that is to be attached to a select one of the teeth;

a second step of fabricating an inner layer by thermoforming a sheet to correspond to a size and a shape of at least a portion of an exterior of the dental mold with the attachment form, such that the inner layer has a recess corresponding to the attachment form;

a third step of placing an aligner magnet on the recess of the inner layer such that the aligner magnet directly contacts an outer exterior surface of the recess of the inner layer;

a fourth step of fabricating an outer layer by thermoforming a further sheet to correspond to a size and a shape of an exterior of the inner layer and the aligner magnet, the outer layer having one continuous recess that houses both the aligner magnet and the recess of the inner layer; and a fifth step of assembling an aligner by receiving the inner layer within the outer layer where the aligner magnet is between the inner layer and the outer layer, wherein:

the inner layer is made of a polymer having one or more polymeric layers, the inner layer is fused with the outer layer by at least one of heat and pressure, such that the inner layer is not detachable from the outer layer, and the aligner magnet is positioned to magnetically interact with the magnetizable component attached to the select one of the teeth, such that:

an inner surface of the inner layer directly contacts the teeth, an outermost surface of the recess of the inner layer directly contacts a surface of the aligner magnet while an opposing surface of the aligner magnet directly contacts an innermost surface of the one continuous recess of the outer layer, and an interface between the inner layer and the outer layer where the aligner magnet is not located is a fused interface where the inner layer is fused with the outer layer by at least one of heat and pressure.

2. The method of claim 1, wherein
the recess of the inner layer is sized and shaped based on the attachment form.

3. The method of claim 2, wherein
the recess of the inner layer is enlarged relative to a size of the attachment form.

4. The method of claim 1, wherein
the inner layer and the outer layer are both polymeric layers.

5. The method of claim 4, wherein
the inner layer, the outer layer, or both are thermoplastic layers.

6. The method of claim 1, further comprising: an additional step of coating the aligner magnet.

* * * * *